UNITED STATES PATENT OFFICE.

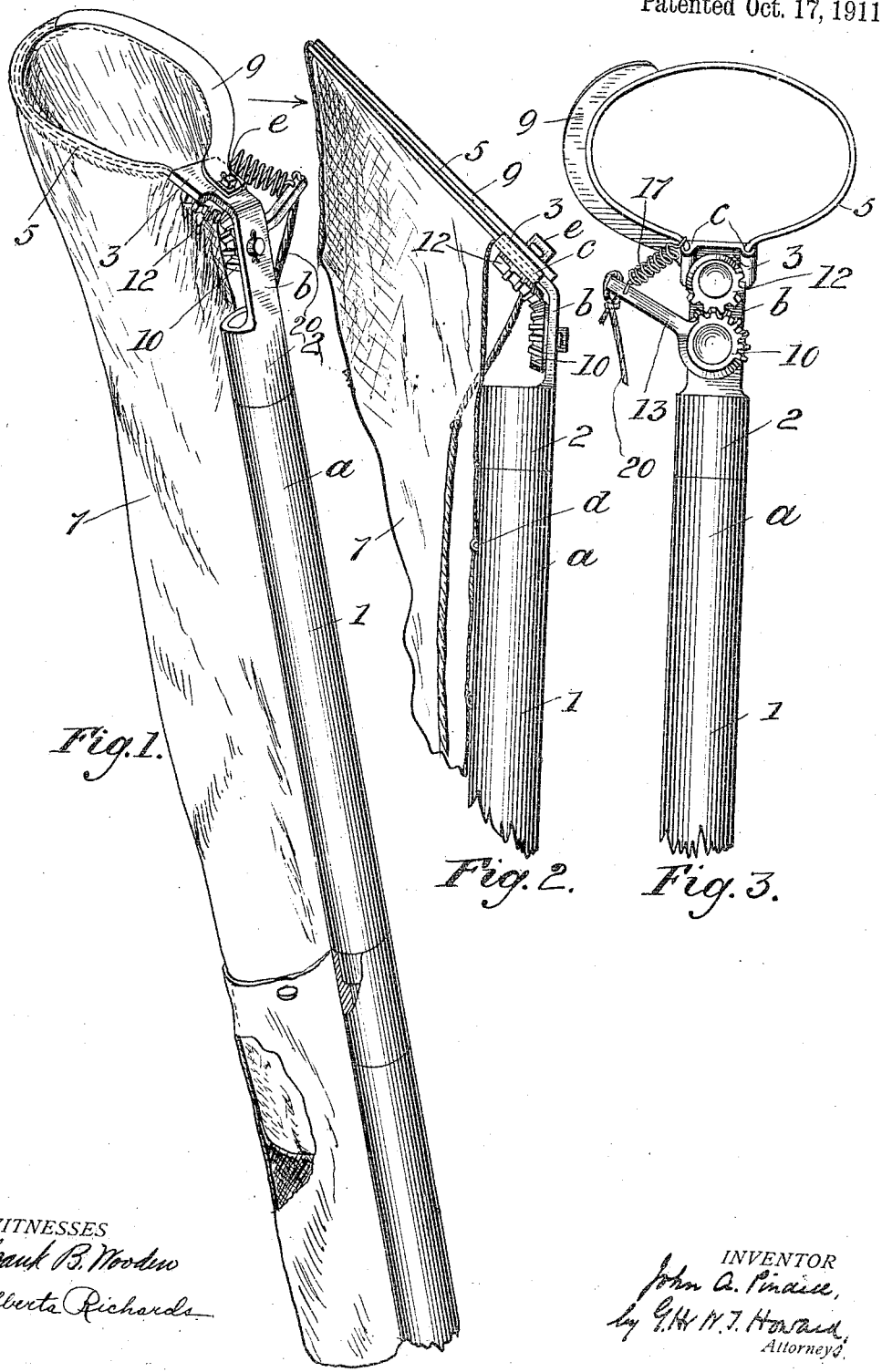

JOHN A. PINDELL, OF COCKEYSVILLE, MARYLAND.

FRUIT-PICKER.

1,006,124.  Specification of Letters Patent.  Patented Oct. 17, 1911.

Application filed April 12, 1911. Serial No. 620,593.

*To all whom it may concern:*

Be it known that I, JOHN A. PINDELL, of Cockeysville, in the county of Baltimore and State of Maryland, have invented certain Improvements in Fruit-Pickers, of which the following is a specification.

This invention relates to certain improvements in that class of fruit pickers in which a fruit-detaching device is used in connection with a flexible chute which receives the fruit as detached, and conveys it to the operator who stands on the ground; and it consists in a peculiar construction of the device as will hereinafter fully appear.

In the further description of the said invention which follows, reference is made to the accompanying drawing, forming a part hereof, and in which,—

Figure 1 is a perspective view of the improved fruit picker. Fig. 2 is a geometrical partly sectional side view of the device, and Fig. 3 is a view of Fig. 2 looking in the direction indicated by the arrow. In this view the chute is omitted.

Referring now to the drawing, 1 is a pole which due to the difference in height of the trees from which the fruit is to be picked is made in separable sections connected by ferrules as shown in Fig. 1. The top section *a* of the pole is fitted with a collar 2 having a flat vertical extension *b* terminating in the head 3 which projects over the collar 2 at an angle of say 45 degrees from a vertical line. The lateral edges of the head 3 are provided with sockets *c* into which are inserted the ends of a hoop 5 to which the chute 7 is attached.

The chute 7 consists of a flexible sleeve formed of some suitable textile fabric such as light duck, and like the pole 1, it is made in sections as shown in Fig. 1. Each section of the chute is attached to its adjacent section of the pole, by staples *d*, and the lower end of an upper section of chute is made to enter and extend a proper distance down the section next below it, as shown in Fig. 1; and if found necessary the united sections can be secured together by buttons or straps. One button is shown in Fig. 1 as connecting the upper to the lower section of the chute.

9 is a vibratory detacher which serves to separate the fruit from the supporting branch of the tree, and it consists of an arm having a lateral curvature corresponding with that of the hoop 5 with which it is practically in contact. In its normal position, the inner edge of the detacher follows the line of the hoop and therefore does not interfere with the entrance of fruit into the chute, but is adapted to be thrown across the chute to sever the fruit, and be returned to its original position when the fruit is detached. The means whereby this result is attained consists as follows:—10 and 12 are mutilated beveled gear wheels in mesh with each other. The shaft of the wheel 10 is journaled in the flat extension *b* of the collar 2, and the shaft *e* of the gear wheel 12 extends loosely through the head 3 and is secured to the detacher 9. The gear 10 is provided with an arm 13 which is connected to the hoop 5 by means of a spiral spring 17 which serves to yieldingly hold the detacher in its normal position. 20 is a cord, fastened to the end of the arm 13 and extending to the ground, and serves as means for operating the detacher through the medium of the said arm and the mutilated gear wheels 10 and 12, as will be readily understood.

I claim as my invention,—

In a fruit picker, a pole carrying a hoop at its upper end and a chute extending downward from the hoop combined with a pivoted vibratory detacher adapted to be swung across the hoop at the end of the chute, a pair of meshed gear wheels to effect the vibratory movement of the detacher, an arm projecting from one of the gear wheels, and an actuating cord secured to the end of the said arm, substantially as specified.

JOHN A. PINDELL.

Witnesses:
JULIA B. ROBINSON,
WM. T. HOWARD.